United States Patent [19]

Schreiner et al.

[11] Patent Number: 4,725,835
[45] Date of Patent: Feb. 16, 1988

[54] TIME MULTIPLEXED BUS MATRIX SWITCHING SYSTEM

[75] Inventors: Stanley M. Schreiner, Stamford; Susan E. Benua, Newtown; Peter Van Raalte, Wilton; David Ambrose, Monroe, all of Conn.

[73] Assignee: T-Bar Incorporated, Wilton, Conn.

[21] Appl. No.: 775,634

[22] Filed: Sep. 13, 1985

[51] Int. Cl.[4] .............................................. H04Q 1/00
[52] U.S. Cl. ................................ 340/825.83; 307/465
[58] Field of Search ......... 340/825.83, 825.84–825.93; 370/80, 85, 95, 112, 67; 307/465

[56] References Cited

U.S. PATENT DOCUMENTS

| | | | |
|---|---|---|---|
| 3,711,650 | 1/1973 | Kuhn et al. | 370/80 |
| 3,811,014 | 5/1974 | Seitz | 370/80 |
| 3,971,891 | 7/1976 | Wolcott | 370/80 X |
| 4,048,672 | 9/1977 | Seiden et al. | |
| 4,393,381 | 7/1983 | Seiden | |
| 4,394,541 | 7/1983 | Seiden | |
| 4,477,898 | 10/1984 | Cholat-Namy | 370/80 |

Primary Examiner—Ulysses Weldon
Attorney, Agent, or Firm—Dann, Dorfman, Herrell & Skillman

[57] ABSTRACT

Ports including at least input and output signal lines are collected into port groups. For each port group three separate clock synchronized time division switches are connected respectively to the input signal lines, bus highways and the output signal lines. All time division switches of the system are synchronized by a system clock and each one is controlled by its own storage of selected addresses in time slot order. A plurality of bus highways is provided and the input time division switch connects signals to a specific bus highway of the system. A second time division switch selects the bus highway for connection to the output section of the port group. A third time division switch selects the output port to which the selected bus highway is connected. In one embodiment the bus highways directly connect the port groups. In another, a central inter-connect matrix is provided to make the connection between the first and second time division switches.

10 Claims, 18 Drawing Figures

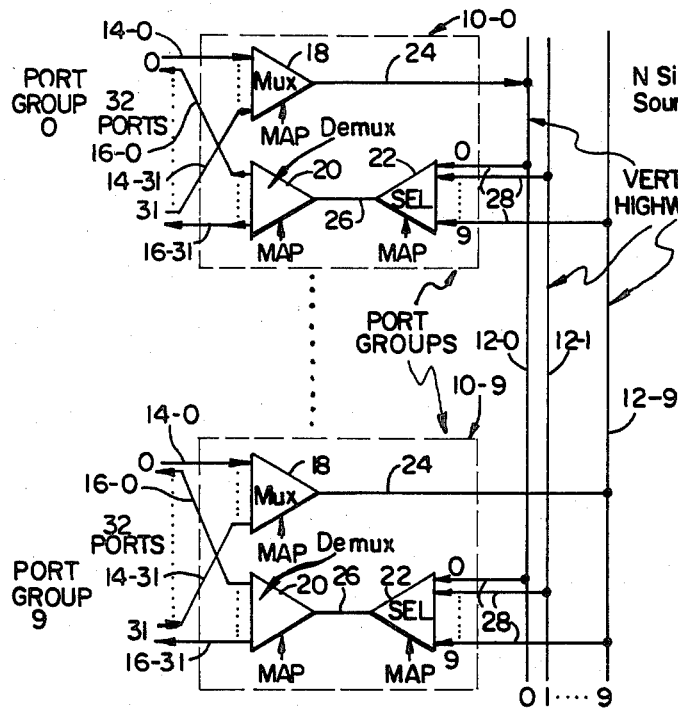
FIG. 1
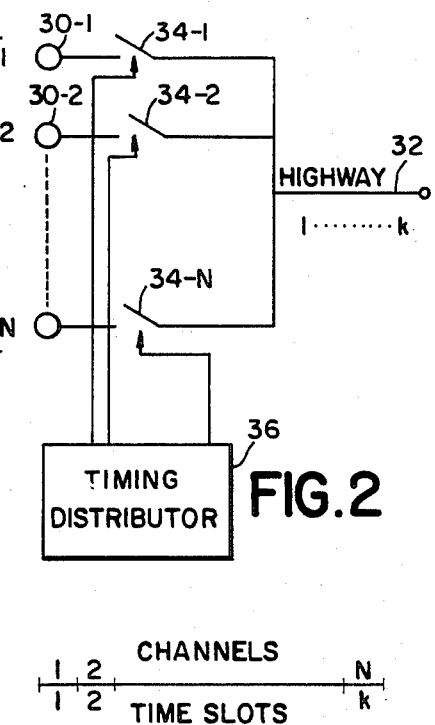
FIG. 2
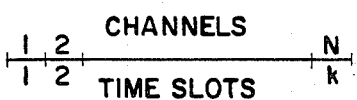
FIG. 2a
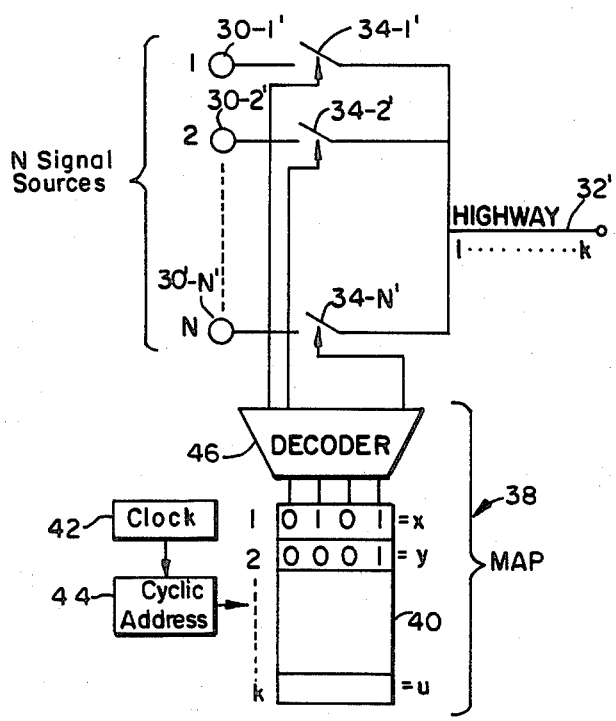
FIG. 3
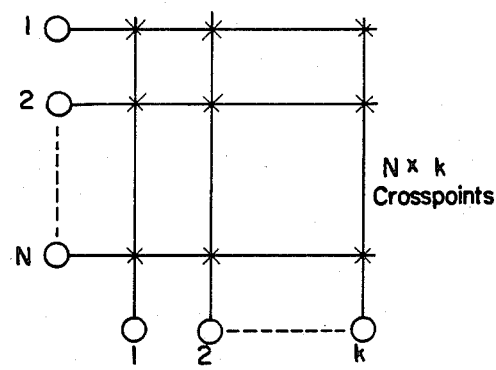
FIG. 3a
FIG. 3b

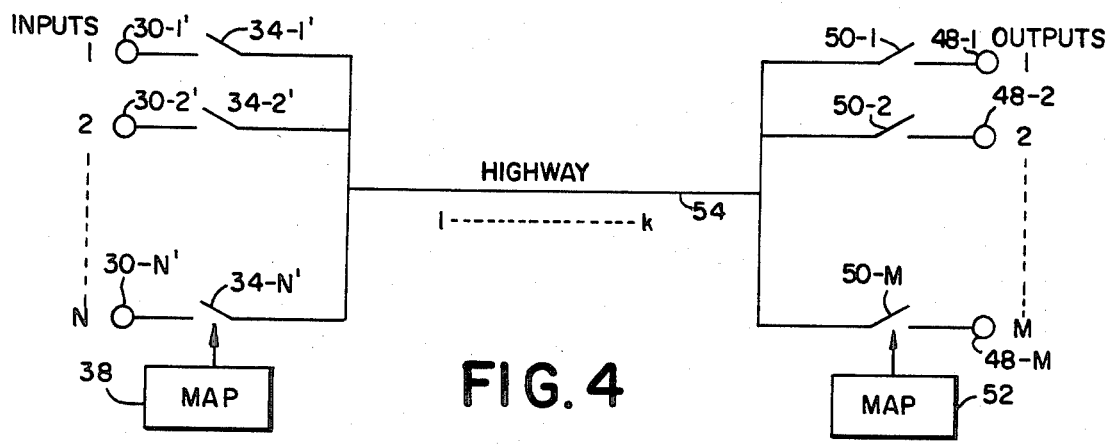
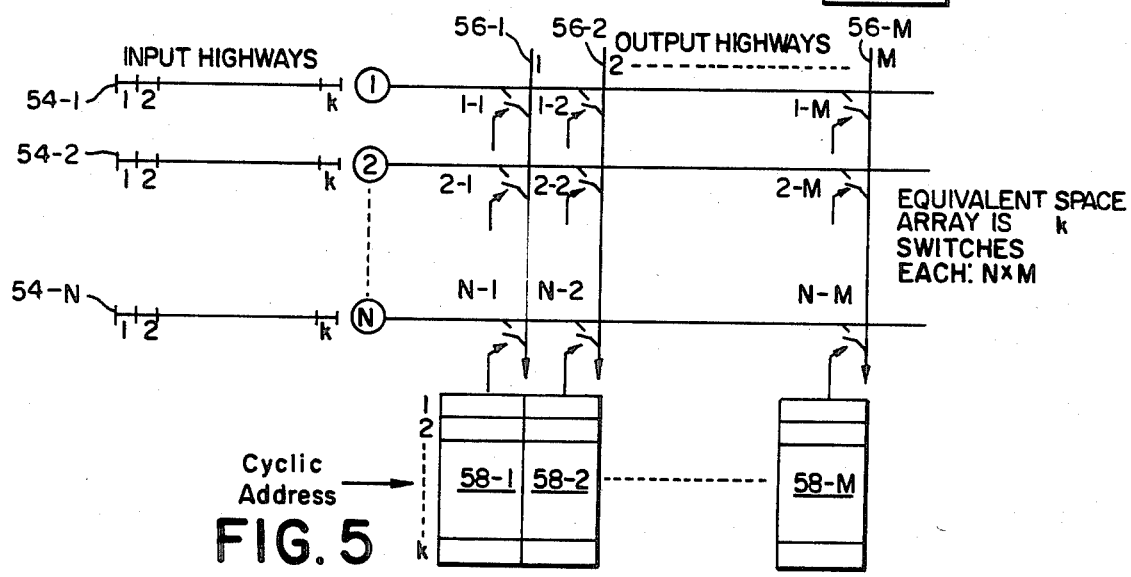
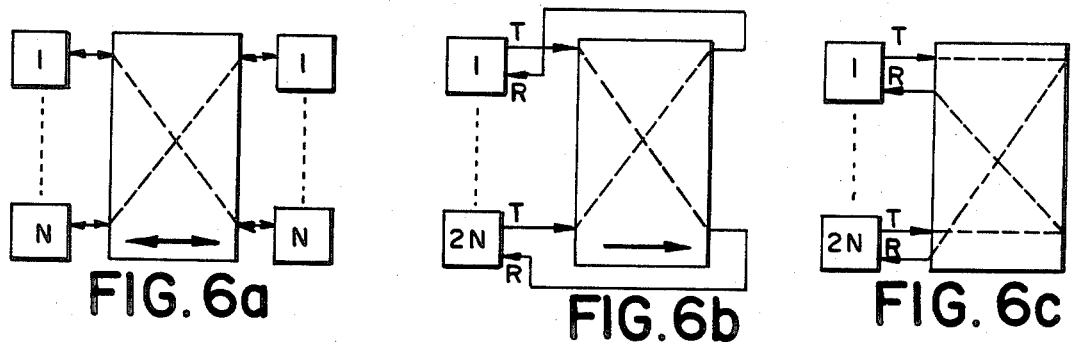
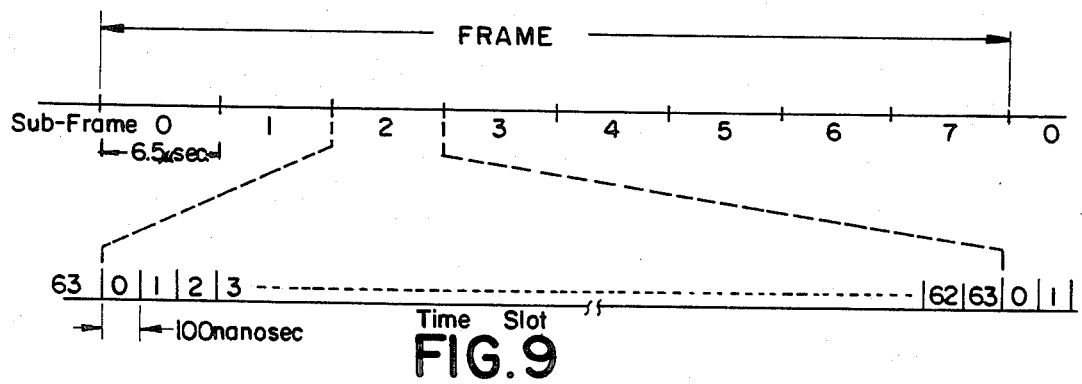

TIME MULTIPLEXED BUS MATRIX SWITCHING SYSTEM

The present invention relates to a matrix switching system which employs separate clock controlled memory access processors to connect each first port to a selected second port. The input signal lines of a port are sampled and placed in a predetermined pattern of time slots. The output signal lines are connected to the input by synchronizing their predetermined pattern of time with those of the input. A selector switch is also used to internally control which possible input signals may be connected to which possible output signals.

More specifically the present invention relates to a matrix switching system in which selected first port may be connected to selected second port, using a selector switch and an array of bus highways or an intermediate switching matrix.

THE PRIOR ART

Matrix switching, whereby various ones of input ports or terminals may be connected to selected ones of output ports or terminals through a plurality of switches has been in practice for many years. The technique has been to provide available switching between each of the input and output lines. This is most easily illustrated where the input lines are shown perpendicular to output lines in a grid and switches are provided at each of their cross points. One such array is shown in U.S. Pat. No. 4,048,672, Sept. 13, 1977, assigned to T-Bar Incorporated, the present assignee. That patent teaches the connection of hard contact switches by the manual pressing simultaneously of switch buttons representative of columns and rows on a matrix array. In the intervening years, switching has become far more complex because it has become necessary to connect effectively many more input lines to many more output lines. In view of the need for increasing switch density, switching systems for the most part have become solid state and various systems have been devised to reduce the number of switches of system connections. An example of such effort is the three stage minimum configuration conditionally non-blocking matrix of U.S. Pat. No. 4,394,541, July 19, 1983, also assigned to T-Bar Incorporated. At the same time, efforts were made to minimize actual transmission line interconnection within a matrix by time division techniques such as disclosed in U.S. Pat. No. 4,393,381, July 12, 1983, assigned to T-Bar Incorporated.

THE NATURE OF THE PRESENT INVENTION

A cable connects to a port, of a port group. The cable contains input signal lines and output signal lines. Therefore the port contains them also. The switching system is used to make a pair of unidirectional connections. The first between the input signal lines of the first port and the output signal lines of the second port. The second between the input signal lines of the second port and the output signal lines of the first port. The present invention is designed to provide a compact bus matrix switching system which employs time division switching. Compact units, which may be located close to the equipment generating and receiving signals to be switched so that cables to the ports of the switching system can be kept relatively short. The individual units themselves use switching that enables any first port to be connected to any second port of the switching system and enables use of essentially all of the ports at the same time. Various patterns of interconnection may be provided for different applications and, by information in memory circuits, those interconnections can be easily changed. Various memory banks may be provided for varying the interconnections in accordance with the maximum practical use of the system.

When it is desired to interconnect a great many ports at relatively remote locations, it is still possible to have a similar unit at each of the respective distributed locations. By bypassing certain internal bus connections the units may be connected by very few cables to a central interconnect matrix which allows any first in the system to be connected to any second port in the system no matter where located. Limiting the number of interconnect cables saves complication and those cables which are used can be carefully designed transmission lines to minimize loss in time delay problems within the system.

More specifically, the present invention, in its simplest form, relates to a bus switching matrix system for connecting selected first ports to selected second ports whereby multiple signals may be sequentially carried by a limited number of bus highways. A plurality of bus highways is provided, one for each port group, each capable of carrying a plurality of time division multiplexed signals constituting all of the signals of the port group. A system clock is required for synchronizing signals. Each of a plurality of port groups, one for each bus highway, provides the connection for cables which contain input signal lines and output signal lines. Separate clock synchronized time division switches are used, one for each port group of input signal lines and one for each port group of output signal lines. One is also used at the selector switch which is described later. Each time division switch includes a storage of the selected signal address in time slot order for each time division switch, hereafter called a MAP, of the selected signal addresses in time slot order for that time division switch to a particular access bus in a sequence determined by the MAP. One of the input buses for each port group is connected to a selected one of the bus highways. The other of the input buses of each port group is connected by a selector switch, controlled by a MAP timed by the system clock, to each of the bus highways. Through the center connection any first port may be selectively connected to any second port.

To employ the aforesaid unit as a component, thus keeping the switching close to the controlled units, the bus highways and local selector switches are not used but connections are made through a central interconnect matrix.

More specifically, a bus matrix switching system for connecting selected first ports to selected second ports whereby multiple signals may be sequentially carried by a limited number of access buses is provided with a central interconnect matrix. A system clock is employed. Each of a plurality of port groups, provides the connection for cables which contain input signal lines and output signal lines of the system separate clock synchronizing time division switches, one for each port group of input signal lines and one for each port group of output lines one used as a selector described below, and each includes a MAP timed by the system clock to connect each line of a kind to a particular output bus in a sequence determined by the MAP.

Corresponding ones of the output buses for each port group provide the respective central interconnect matrix inputs. The other output buses provide the respective matrix output for the central interconnect matrix, each output bus being connected by a selector switch controlled by a MAP timed by the system block to be selectively connectable to each of the central interconnect matrix inputs. By this system, any port in any location may be selectively connected to any port in any location.

SPECIFIC EMBODIMENTS OF THE PRESENT INVENTION

For a better understanding of the present invention, reference is made to the accompanying drawings in which:

FIG. 1 shows a compact bus matrix switching system for use in the location of equipment to be input and output from the system;

FIG. 2 shows the nature of a time division multiplex system;

FIG. 2a shows the kind of signal channel employed with the time division multiplexer of FIG. 2;

FIG. 3 shows a time division switch and defines the MAP;

FIG. 3a shows time slots and their assignment in accordance with the time division switch principle;

FIG. 3b shows the equivalent space array of the time division switch;

FIG. 4 shows a technique for interconnecting time division switches using a highway;

FIG. 5 shows a time multiplexed switch in a space switch configuration;

FIG. 6a shows diagramatically a two-way or bi-directional network;

FIG. 6b shows a unidirectional two-sided network;

FIG. 6c shows a folded representation of the network shown in FIG. 6b;

FIG. 9 shows diagramatically the time scales involved in the time division switching of the present invention;

Figure 8:
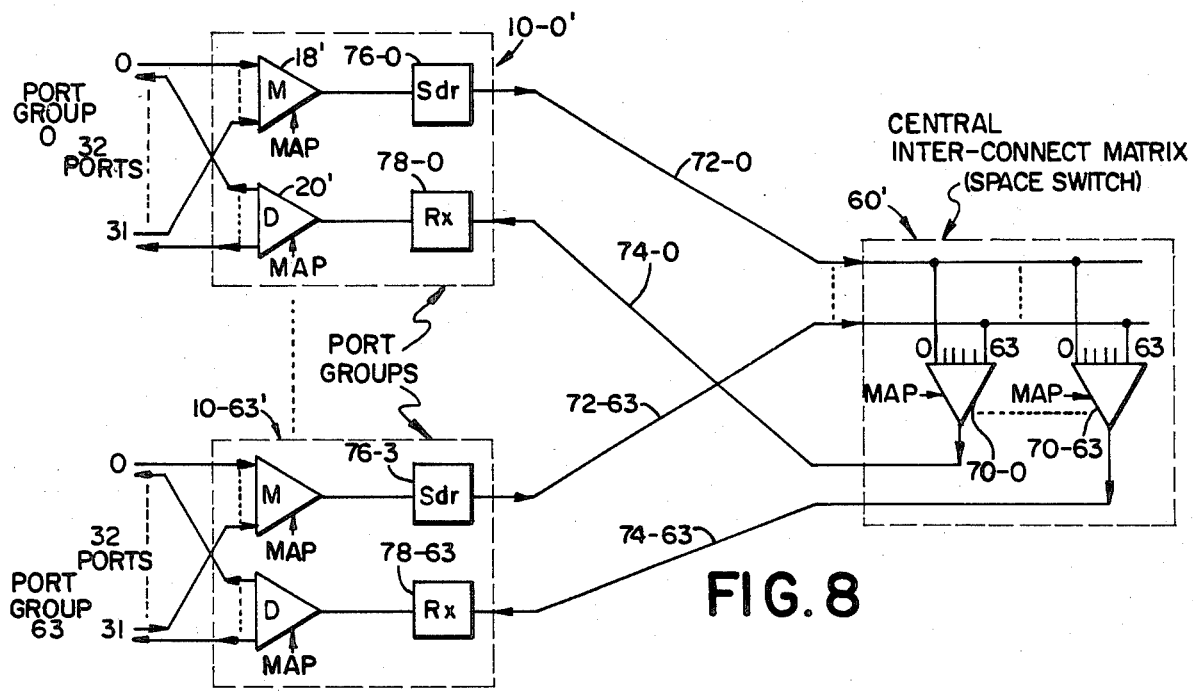
FIG. 8 shows the system of FIG. 1 modified to include a central interconnect matrix.

Referring first to FIG. 1, there is shown a plurality of port groups designated 10-0 through 10-9, all but the first and last of which are omitted but will be understood to be identical to those illustrated. Also shown are vertical highways which represent four wire buses, for example, designated 12-0 through 12-9, only three of which are shown in the drawing. Each of the port groups has 32 ports in this particular embodiment with each of the ports having an input signal line and an output signal line as illustrated. The possibility exists of there being separate ports for each input and each output, but advantages accrue from having an input and an output into each port for combination external cable connection. The input signal lines are numbered 14-0 through 14-31. The output signal lines are numbered 16-0 to 16-31. Since each of the port groups is identical, the internal structure is similarly numbered in each case.

Each set of input signal lines leads to a time division switch 18 which is controlled by a MAP. Each set of output signal lines similarly is connected to a time division switch 20, also controlled by a MAP. The time division switch 18 is, in turn, connected to one of the bus highways 12-0 through 12-9, each being connected to a separate bus highway. There are ten port groups each connected to its own bus highway. Thus, port group 10-0 has its time division switch connected to highway 12-0 and port group 10-9 has its time division switch connected to bus highway 12-9. The bus highways, in turn, are all connected ten different times to a time division switch 22 in each of the port groups. Similarly, the connection of the time division switch 22 connect any of the highways to output signal line bus 26 and then, via time division switch 20 to any output signal line. The connections from each of the vertical highways to the time division switch 22 in each case has to provide the lines 28 with sufficient conductive paths to provide whatever signals are required in a particular application. The time division switch 22 is known as a "selector" since it selects which of the bus highways is employed.

Referring now to FIGS. 2 and 2a, there are shown a diagramatic illustration of components required for a simple time division multiplex system. In this connection it needs to be recalled that the intelligence that is being carried on each of the lines discussed in connection with FIG. 1 is a modulated signal, perhaps a binary modulated signal relating to a computer code or program. There are N input terminals 30-1 through 30-N, each receiving a separate signal from n signal sources. These signal sources are provided with one output highway or bus 32 on which sufficient intelligence to reconstruct each of the signals is provided. This is accomplished by providing switches 34-1 through 34-N, preferably of a solid state type so that they may be very rapidly opened and closed in each of the lines 30-1 through 30-N. A timing distributor 36 functions to provide signals to close the switches for very short time periods or slices. The switches are closed sequentially and ordinarily in numerical order. Thus, as shown in FIG. 2a, for each time slot, 1 through k, there corresponds a time slice or channel of information corresponding to that provided on the input terminals 30-1 through 30-N in repeatable sequence. In most cases, k can correspond to N in such a simple system, but there may be reasons to provide more than N time slots in order to permit control information to be passed as well. The time slices or information are sufficiently large to obtain an accurate sample of the signal and sufficiently small that they can be repeated sufficiently so that little fidelity is lost in the original signal, particularly in binary signals used in computers.

It is important to note that the time division multiplexer of FIG. 2 is different from a time division multiplexer in which the sources of information are character interleaved or even bit interleaved. This form of multiplex is a sample data system. In theory, if each of the sources is a band-limited signal, it is sufficient to sample at a rate equal to twice the highest frequency. However, in order to preserve the relative phase between data and clock signals on an interface like RS-232, it is necessary to sample at a much higher rate: at least 8 samples per bit interval.

Referring now to FIG. 3 and associated FIGS. 3a and 3b, the same kind of system is provided and the circuit portions are labeled with the same number designators with the additions of primes. However, instead of the cyclic timing distribution of FIG. 1, the sampling switches 34-1, through 34-N' are controlled by a MAP 38. The connection sequence in this case is not sequential as in the time division multiplexer of FIG. 2 but is stored in a memory 40 by a control processor (not shown). The addresses of any of the switches giving access to the N signal sources may be written in any of the k cells of memory 40. The k cells of the memory are read cyclically and sequentially by a sequential triggering signal from the clock 42 which triggers the cyclic address system 44. The k cells of the memory are read cyclically by the decoder 46 and in each time slot the stored address is decoded to control the corresponding switch 34-1' through 34-N'.

FIG. 3a is intended to show that any desired association of the sources 1 ... N to the time slots 1 ... k can be selected, the channels marked x, y and u representing the selected numbers 1-n. Therefore, the configuration of FIG. 3 is the equivalent of an N×k space switching matrix array as shown in FIG. 3b where there are potential switches at each cross point at the N input and k output leads. Furthermore, the number of time slots k may be smaller or larger than the number of sources N depending on a particular application. That is, the matrix does not have to be square. Of course, it will be understood that in practical systems, the particular memory 40 used for a given sequence remains the same so theat the same switches are actuated in the same sequence of connections made time after time until the memory is changed. But the possibility exists of changing the memory is changed. But the possibility exists of changing the memory either by changing a memory which is in place or substituting a permanent memory such as a different chip having a different desired sequence.

FIG. 4 shows that two time division switches of the type shown in FIG. 2 may be connected back to back to transfer samples between N inputs and M outputs. The transfer may be unidirectional or may be bi-directional. Also, both sets of switch contacts may be controlled by a MAP or one set may be cyclically addressed and the other controlled by a set memory. In any event, the input applied at a particular numbered terminal does not have to occur at the output of the corresponding numbered terminal. It is significant that although equivalent to a space array of N×M crosspoints, only N+M transmission gates are required, which amounts to a substantial reduction in the system complexity.

More particularly, the input signals on input terminals 30-1' through 30-N' are sliced into time slots by the action of MAP 38 on switches 34-1' through 34-N' to place on bus highway 54 the type of signal illustrated in FIG. 3a. That signal, in turn, is passed by switches 50-1 through 50-M to outputs 48-1 through 48-M as directed by MAP 52 which is synchronized by the same clock signal as MAP 38 therefore using a single highway bus instead of N or M. The total message may be transferred over the length of the bus.

Of course, there are various addressing options possible as shown by the following table:

| Addressing Options | |
|---|---|
| Cyclic: | Clock Address |
| Acyclic: | Memory Address |
| Options: | |

| Input | Output |
|---|---|
| Cyclic | Acyclic |
| Acyclic | Cyclic |
| Acyclic | Acyclic |

Certain limitations exist in this type of network. For example, reliability is a problem since a single failure causes loss of the entire switch network. This problem can be minimized by using redundant highways and by distributing the memory, i.e., locating each memory cell with its associated contact. To be economical this distributed memory usually requires LSI implimentation as in the TSAC circuits used with some PCM switches.

Another disadvantage is that the maximum size of this type of switch is limited because, as the number of inputs increase, the number of time slots on the highway increases and, therefore, the required operating speed rapidly increases. At the same time, physical size of the unit also increases. A classical solution to the size limitation, both in space division switching and time division switching networks, is multi-stage networks, such as the network described in U.S. Pat. No. 4,394,541.

FIG. 5 shows a time multiplex switch which is in the form of a space switch. This type of switch matrix network may be used to interconnect highway systems of the time division switch of FIG. 3, for example. A connection between an input highway and an output highway uses incident time slots on the respective horizontal and vertical highways. The horizontal highways are numbered 54-1 through 54-N and the vertical highways 56-1 through 56-M. The crosspoint switches are labeled 1-1, 1-2, 2-1, 2-2 through N-M with the identifying number of the horizontal input highway being indicated first and that of the output highway being indicated second. In this situation, each vertical highway has an associated cross point control memory 58-1 through 58-N which actuates each of the switches associated with that highway. It will be understood that the memories may be associated with the input as well as with the output highways. Each of the memory access processors has a memory containing at least k cells, one for each time slot. The address stored in each cell indicates the horizontal highway to be connected to that vertical during the corresponding time slot. The array is therefore equivalent to k separate N×M space division switches, since in each of the k time slots, the configuration of the N×M switch is different. Time slots on the horizontal and vertical highways are also equivalent to the spider web of wires interconnecting stages in a space division network.

Figure 7:
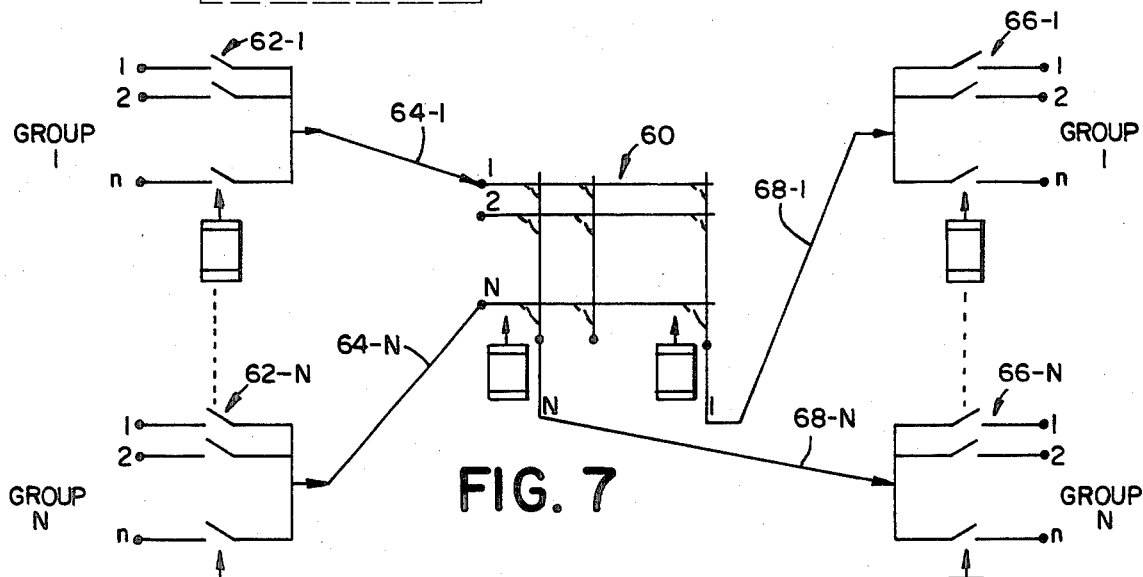
FIG. 7 shows a three stage time division switch.

Referring to FIG. 7, a three stage time division switching network in accordance with the present invention is shown. The switching arrays of FIGS. 3 and 5 may be interconnected to produce the three stage array. Any input may be connected to any output by choosing a time slot which is simultaneously free on both the horizontal and vertical highways of the mid stage matrix 60. The first stage consists of time division switches 62-1 through 62-N of the construction of FIG. 3 having access highways 64-1 through 64-N, the extensions of which through the ports of matrix 60 provide the horizontal buses of mid-stage matrix 60. Similarly, the output time division switches 66-1 through 66-N are connected by access highways 68-1 through 68-N to the vertical buses of network matrix 60 through the output ports network 60. As previously mentioned this arrangement may be the equivalent of FIG. 5.

Referring now to FIGS. 6a, 6b and 6c, these diagrams are intended to show how a network with N inputs and N outputs can be treated. FIG. 6a shows the conventional bidirectional network which is common in metallic crosspoint networks and some electronic networks. The concept is that input ports are located on one side and output ports on the other side but signals can go either direction through the network and connections can be made between any input and any output port in accordance selection techniques which may be quite varied. In a full matrix being N inputs and N outputs, there would effectively be $N \times N$ or $N^2$ crosspoints.

Because electronic devices are unidirectional, it is often more convenient to implement a unidirectional network as shown in FIG. 6b using two separate unidirectional paths to provide a full duplex connection. In FIG. 6b, instead of output ports, the lines are effectively returned a port so that each port has a transmit and receive line and because of the internal switching and the cross back connection externally, the transmit and receive connections may not correspond in sequence and provide different signals at a given port. The last port is shown as 2N. However, in reality where both transmit and receive are in a single port, the first block might be labeled 1 and 2 and the last block (2N−1) and 2N. This arrangement also requires $2N \times 2N$ crosspoints, but each crosspoint requires only half the number of contacts required in FIG. 6a and simplicity of implementation compensates for the extra number of crosspoints.

FIG. 6c shows the equivalent and more common form of FIG. 6b in which the connection is internal of the network back to the input. FIGS. 6c and 6b are intended to be the electrical equivalents of one another.

Unidirectional networks for data, as shown in FIGS. 6b and 6c, have the following advantages for data switching use:

1. any mix of DTE and DCE ports may be equiped;
2. connections of DTE to DTE or DCE to DCE may be made in addition to the normal DTE to DCE connections;
3. half duplex connections may be made for monitoring, broadcast or other applications; and
4. loopback connections can be implemented with no extra hardware.

Each of the features described can be included in the network of FIG. 1. As a practical matter, the structure of FIG. 1 and the product to be made commercially consists of a maximum of ten port groups of 32 ports. The multiplex access highway output from each port group drives a bus highway which connects to all of the port groups. Each port group contains a selector switch 22, which is the associated vertical of the mid-stage highway interconnect matrix. In effect, the time multiplex switch of FIG. 5 which functions to distribute the signal among the port groups, is distributed so that each port group contains a vertical of the switch.

FIG. 8 is an extension of FIG. 7 with the techniques of FIGS. 6b and 6c applied. That is, the central interconnect matrix 60′ instead of being a straight time multiplexed switch, such as that shown in FIG. 5, is provided with the equivalent of a time division switch of FIG. 3 at each crosspoint and the network is folded back on itself. Direct comparison can be seen with FIG. 1 wherein the time division switches 70-0 through 70-63 are analogous to the selector 22. The individual port groups are now 10-0′ through 10-63′ so that there are a total of 64 port groups each with 32 ports, each port having input and output signals. Thus, the number of connections that can be handled is $32 \times 2 \times 64$, greatly increasing the power of the system. Each of the port groups may be provided in separate cabinets or a few port groups collected in a single cabinet placed close to equipment being serviced so that lines are being kept very short to the first point of switching and the last point of switching 18′ and 20′, respectively. The selector 22 is eliminated and the vertical bus highways 12-0 through 12-9 with their relatively short paths are also eliminated. More lengthly paths through MAP controlled switches 72-0 through 72-63 are substituted so that the distances become greater between the local port groups and the central interconnect matrix. Therefore, additional modem-like equipment 76-0 through 76-63 acting as a sender to line 72-0 through 72-63 and similar modem-like elements 78-0 through 78-63 acting as a receiver connect to return access highways 74-0 through 74-63. Using such techniques, it is possible to use somewhat extended lines and still get the benefit of the central interconnect matrix which greatly increases the size of the total switching capacity.

It will be observed then that a unit consisting of port groups not necessarily 0 through 9, but some number up to 10 total units may effectively have their vertical bus highways bypassed and disconnected and their selectors 22 bypassed as well in favor of the equivalent members 70-0 to 70-63 in the center interconnect matrix 60′. Thus, the unit of FIG. 1 can be revamped for inclusion in a system of FIG. 8 with very little of the original system being unused. Therefore, a user can start off with the system of FIG. 1 in varying size groups and ultimately build a system of the type of FIG. 8 without having to discard his previously acquired equipment.

What is occurring in the system of FIGS. 1 and 8 is illustrated in FIG. 9.

FIG. 9 shows the time frame structure used in the system of FIGS. 1 and 8. A sub-frame of 6.5 microseconds is composed of 64 time slots of approximately 100 nanoseconds duration. Eight subframe make up a frame of 52 microseconds.

To be non-blocking it is necessary for the multiplex highways to have 63 time slots, i.e., (2n-1) where n is 32 ports. Actually, 64 is more easily implemented with digital logic. With a sampling rate which is eight times 19.2 kb, the resulting highway rate is approximately 10 Mhz (actually 9.8304 Mhz). If the signals from the ten leads of an RS-232 interface were inserted serially in a time slot, it would require only a single wire for the multiplexed highway, but it would have to operate at 100 Mhz. To carry all ten leads in parallel is costly. Therefore, only the data and clock signals which require the high speed sampling rate are transferred through the switch on separate leads. A frame consisting of 8 sub-frames of 64 time slots is used. The RS-232 control leads are sub-multiplexed on a fourth wire—one signal in each sub-frame. This allows for seven control signals plus a "guide wire." The "guide wire" contains a pattern which is used to verify the continuity of an established connection. Although this does not verify 100 percent of the path, it does verify that all of the connection memories are correct, that the control lead path is good, and in the configuration of FIG. 8 that the Space Switch connection is good. Choosing a submultiplex of eight is more than adequate for control and secondary data channels. It will support up to 2400 bits per second on secondary data. On a 19.2 kb channel a change on a control lead will be transferred with an average delay of one-half a bit time or a maximum delay of one bit time. At lower data rates, the delay on a control signal will be a proportionately smaller fraction of a bit time.

Figure 10:
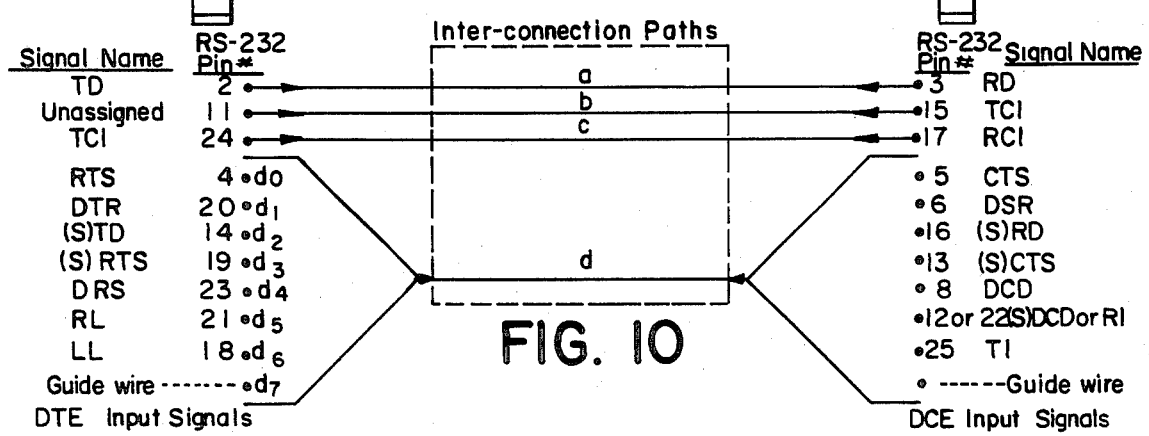
FIG. 10 shows the effective four wire connection in each cable or line involved in internal connections in the apparatus of the present invention.

FIG. 10 shows the nature of the four conductor cable comprising conductors a, b, c and d. Two of the conductors must be assigned to clock signals, a third to processing controls and the fourth to information or data signals.

Figure 11:
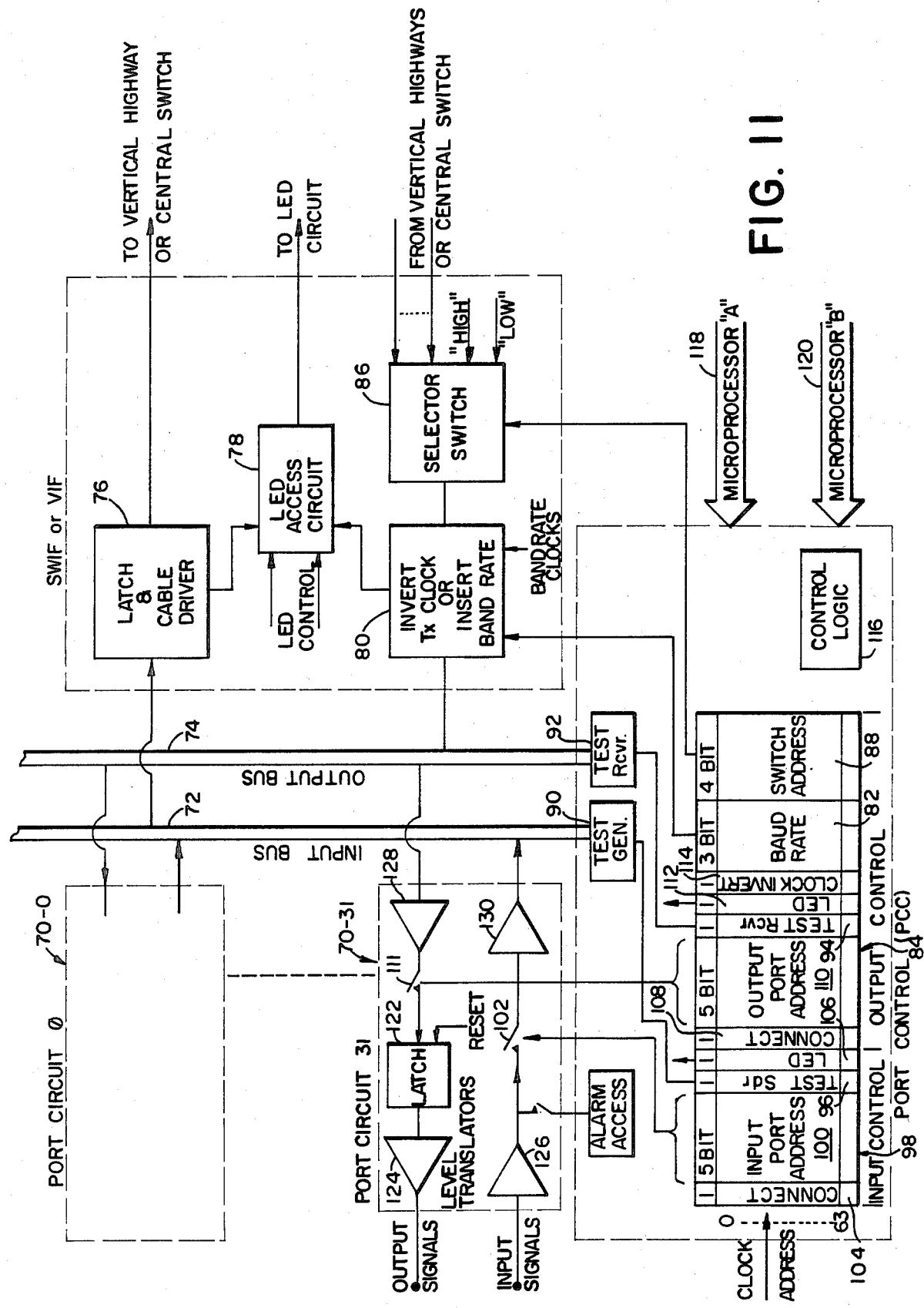
FIG. 11 shows a break down of the port group, especially showing the controls therefor.

Referring to FIG. 11, some detail is shown relative to the circuitry employed. As can be seen, the port circuits here designated 70-0 through 70-31 are intended to be duplex ports having both input and output signal lines, the input signals going to an input bus 72, and the output signals going an output bus 74. Signals on input bus 72 go to in turn to the vertical highway or central switch through latch and cable driver 76. They may pass through an LED access circuit 78, which controls an LED display circuit and which is subject to LED controls as shown.

The circuit 86 selects one of inputs from the vertical highways under control of the space switch address provided by element 88. For test purposes, two addresses allow selection of either logic 1 or logic 0, high or low which will provide either Mark or Space output from the port circuit. Circuit 80 under control of element 114 provides the capability to invert the Tx clock which is sometimes required to compensate for delay through the switch. Also, under control of element 82, it provides the capability to insert data rate clocks, derived from the switch clock, into the output. This provision may be required, for example, on DTE to DTE connections where Tx and Rx clock signals must be supplied to the DTE's or in applications where it is desirable to supply external clock to a DCE. Circuit 80 also drives the output bus 74 with the time multiplexed signal which goes to the output circuits 128 of all port circuits.

The input bus also may have a test generator 90 on it, and the output bus 74 may have a test receiver 92 on it. Each of these may be triggered by the controls, and portion 94 of the output control 84 may trigger the test receiver 92. A portion 96 of the input control 98 may trigger the test generator 90. The input control 98 also has various bits assigned to it, including a five bit input port address 100, which triggers the appropriate input switch 102 to feed the signal to the input bus 72. It also has a connect channel 104 and LED channel 106.

The output control has a connect bit 108, an output address 110, an LED bit 112 and a clock invert bit 114, all available for test and informational use. The input and output controls are controlled by the clock address mechanism and the whole system is controlled by the control logic 116, operated on by the Microprocessor "A" 118 and the Microprocessor "B" 120. The output port address 110 controls the output switches 111 connecting the output bus 74 to the output signal connection in each port. Latch 122, having a reset, is provided in each output signal line. Level translators 124 and 126 are provided in each of the output and input signal lines, as are appropriate modems 128 and 130.

Figure 12:
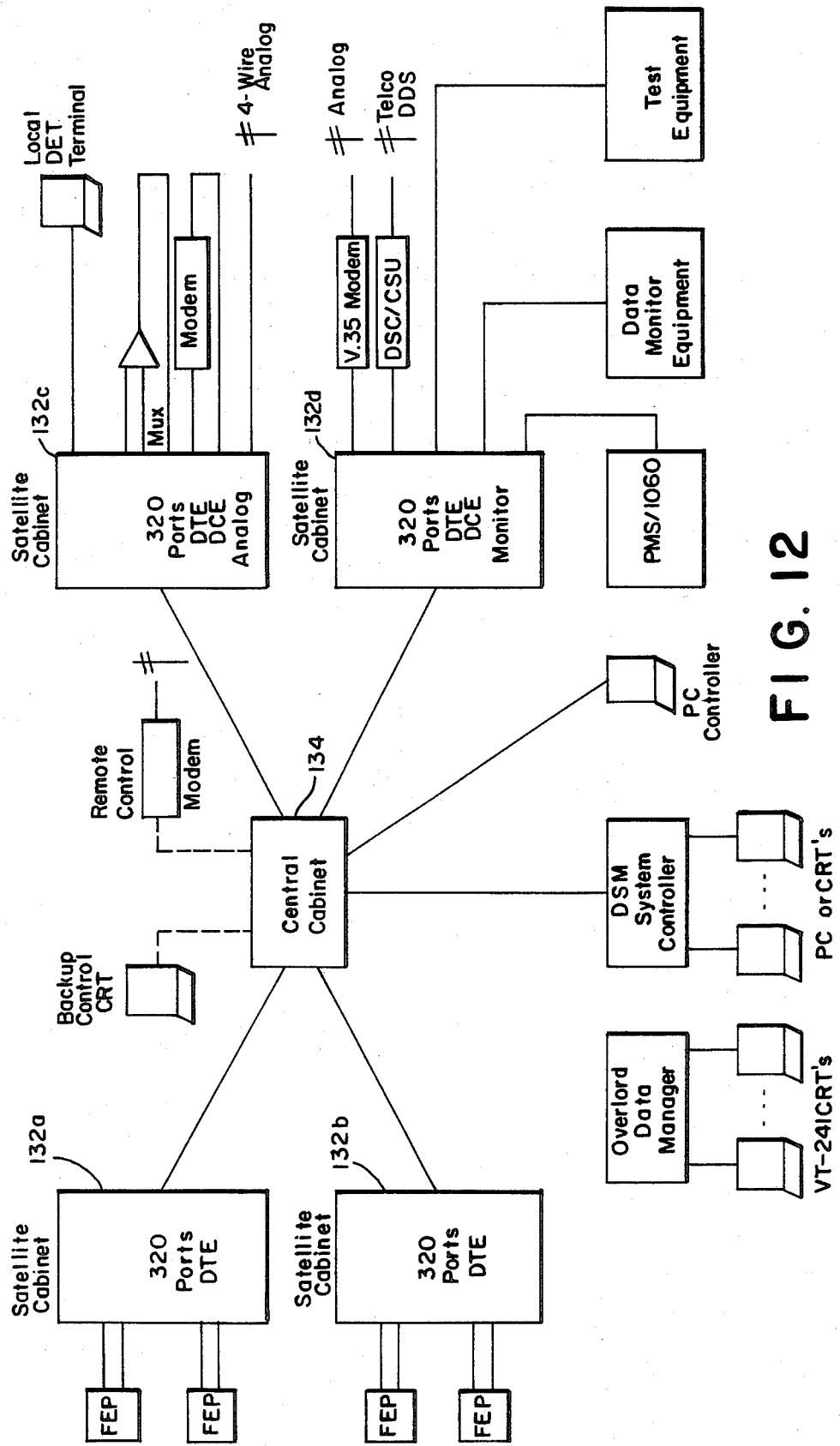
FIG. 12 is a diagram showing an example application of equipment in accordance with the present invention.

FIG. 12 is an overall system view, wherein systems like that shown in FIG. 1 may be modified and combined into a system like that shown in FIG. 8. These so-called "satellite matrix systems" are in satellite cabinets. Satellite systems 132a, 132b, 132c, and 132d are all relatively similar systems, but may have different kinds of connections to their port in these systems shown. Satellite cabinet 132a provides 320 ports of DTE with FEP type inputs. Satellite 132b shows 320 ports of DTE, again with FEP inputs. Satellite cabinet 132c shows 320 port of DTE, DCE and anologue connections, and satellite cabinet 132d shows 320 ports of DTE, DCE and monitor connections. Various kind of connections that can be used are represented and labeled in this diagram. The satellite cabinet circuitry is connected to central cabinet 134, and, in this case, various kinds of controls and output are shown such as a data manager, having various types of CRT monitors, a DSM system controller having PC or CRT monitors. The DSM system controller acts upon the circuit of the central cabinet. Back-up control CRT is also provided, and remote control modem connection may be provided, if desired. This system shows various possibilities for application of the system as described above.

Figure 13:
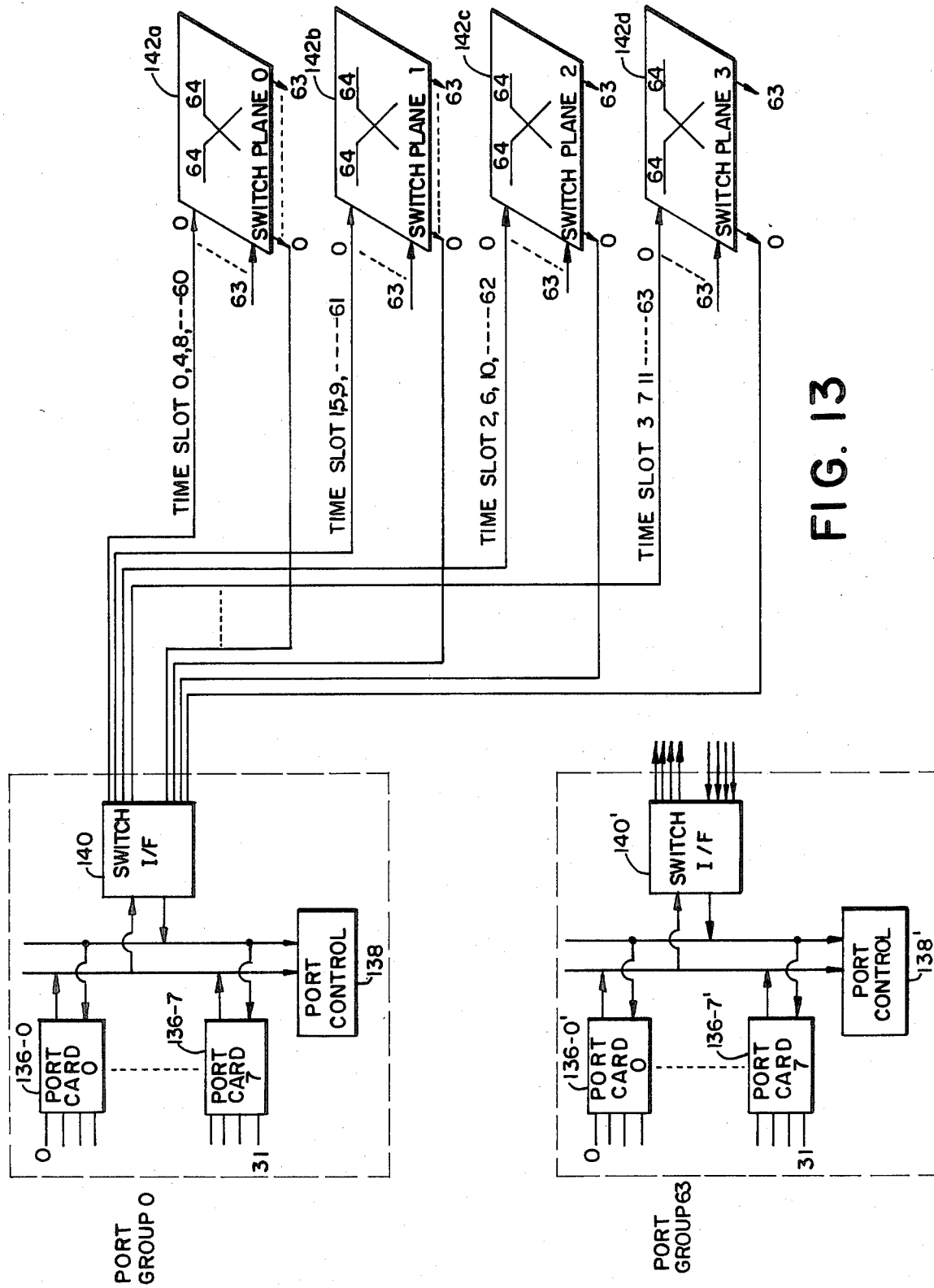
FIG. 13 shows division of the central switch into four separate planes.

FIG. 13 has to do with another advantageous feature of the present invention relating to the system of FIG. 8.

The port groups, corresponding to FIG. 11, contain eight port cards 136-0 through 136-7 for port group 0 and similar cards for each port group all under control of port control card 138.

The central switch of FIG. 8 advantageously is divided into four separate planes 142a, 142b, 142c and 142d, as diagramatically represented in FIG. 13. Such division has several advantages in implementation. In a typical system, for example, four parallel line 64-time slot multiplex highway may be converted to four separate serial highways by switches 140 to 140' routed through a different space switch plane. Plane 0 receives time slots 0, 4 - - - 60; plane 142b receives time slots 1, 5 - - - 61; plane 142c, time slots 2, 6 - - - 62; and plane 142d, time slots 3, 7 - - - 63.

Each space switch plane contains two control cards: one to interface the active, and one to interface the stand-by processor which redundancy is a usual provision. Redundant clock signals are also provided via the two control cards so that if one card is removed for maintenance, the other can provide clock to the switch cards. Also, power to the switch planes is redundant.

In the example, each switch plane contains up to 16 switch cards. The switch cards (not shown) receive the serial input from four port groups, which are regenerated and drive horizontal buses on the switch backplane. They also contain four switch verticals and drivers to send signals back to the same four port groups.

One switch card must be equipped in each switch plane for every four port groups. A 2048 port system has 64 port groups and, therefore, requires 64 switch cards, 16 in each switch plane.

An advantage of such division is that any single component failure should only affect a single switch card because of the redundant control, clock and power for a switch plane. If a single card fails it could cause the loss of 64 communication paths—4 port groups × 16 time slots. However, because the overall system is only broadly illustrated in FIG. 12, it may not be clear that the path search algorithm distributes connections evenly over all four planes and on average only half of these paths are actually involved in connections. Therefore, only 32 connections are disturbed.

Furthermore, since the connection path is serial, a fault will be detected by the "guide wire" alarm normally provided in the overall system of FIG. 12 and the switch control can automatically restore the affected connections through a different plane. The probability of blocking with only three out of four planes working is very low.

The actual transmission between each port group and a switch plane uses two lines in parallel in order to halve the bit rate to allow time for circuit delays, timing errors and cable propagation delay.

The duplex switch control processor, in the system of FIG. 8, is located in the central rack of the system of FIG. 12 together with the four planes of the central switch interconnect matrix. Each port group rack in the completed system has a duplex rack control processor as seen in FIG. 11 which handles the writing of orders to hardware, reading hardware data, and performs alarm scanning within that rack. All of the "A" rack microprocesors 118 are connected to the "A" switch controller and all of the "B" rack microprocessor 120 are connected to the "B" switch controller. The connections are via a high speed twisted pair LAN network with communication processors which off-load the communication handling from the processors. In the event of any fault, control is switched from the "A" set to the "B" set of controllers.

The switch control calculates the required connections to establish or disconnect a path and the active processor sends the orders to write the connection information into the connection memories of the central switch. The switch control also calculates the required data for the input and output connection memories in the port groups including the displacement in time slots due to the delays through the switch path. It then sends orders to the rack controllers to write the necessary data in the connection memories to establish or disconnect the complete path.

While the present invention has been described in terms of specific embodiments, it will be clear to those skilled in the art that many variations can be made in the systems described. All modifications in accordance with the claims are intended to be within the scope and spirit of the present invention.

We claim:

1. A bus matrix switching system for connecting selected first ports to selected second ports whereby multiple signals may be sequentially carried by a limited number of bus highways comprising:
   a plurality of bus highways, one for each of a plurality of port groups, each capable of carrying a plurality of time division multiplexed signals and together carrying all the signals of the system;
   a system clock;
   a plurality of port groups, each port group providing a plurality of input and output signal lines and a port group bus selector;
   separate clock synchronized time division switches, one for each port group of input signal lines and one for each port group of output signal lines and one for each port group bus selector; and
   memory providing storage of a MAP of the selected signal address in time slot order for each time division switch, each MAP timed by the system clock to connect each input signal line to a corresponding output signal line through a particular bus highway in a sequence determined by the various MAPs, one of the bus highways being connected to each input signal line from each port group through its time division switches and the corresponding output signal line being connected through its time division switches to the group bus selector which in turn is connected to selected buses by its time division switches.

2. The bus matrix switching system of claim 1 in which each of the ports provides a plurality of input and output signal lines.

3. A bus matrix switching system for connecting selected first ports to selected second ports whereby multiple signals may be sequentially carried by a limited number of access buses comprising:
   a system clock;
   a plurality of port groups, each port group providing a corresponding number of system input and output signal lines, separate clock synchronized time division switches, one for each set of input signal lines and one for each set of output signal lines, a memory providing storage of a MAP of selected signal addresses in time slot order for each of the time division switches, each MAP timed by the system clock to connect each input signal line to a corresponding output signal line through a matrix time division switch in a sequence determined by the respective MAPs at each port group; and
   a central interconnect matrix having a separate clock synchronized time division switch for each port group controlled by a memory providing storage of a MAP of selected signal addresses in time slot order for connecting the selected input signal line from each port to the selected corresponding output signal line of any selected port group during each time slot in a sequence determined by its MAP.

4. The bus matrix switching system of claim 3 in which each of the ports provides a plurality of input and output signal lines.

5. The bus matrix switching system of claim 3 in which a combined port control provides input and output addressing through the respective MAPs for all of the ports in a port group.

6. The bus matrix switching system of claim 5 in which the port control may also include switch addressing through the respective MAPs for each of the central interconnect matrix selector switches.

7. The bus matrix switching system of claim 6 in which processor controls are provided through control logic to select switch paths in the port circuit and in the selector switch.

8. The bus matrix switching system of claim 7 in which the processor controls are provided on a redundant basis.

9. The bus matrix switching system of claim 3 in which a plurality of switch planes are provided for each port group into the selector switch whereby adjacent cables are connected into different switch planes so as to provide a distribution of the cables from a given port group into the switch planes and so that in the event of failure of any one switch plane, the others can remain functioning and allow reprogramming to replace non-functioning connections.

10. The switch means of claim 9 in which there are four switch planes for every port group so that each switch plane connection card receives every fourth lead connection.

* * * * *